United States Patent [19]
Odogaki et al.

[11] 4,428,558
[45] Jan. 31, 1984

[54] PROPORTIONAL SOLENOID

[75] Inventors: Takaharu Odogaki, Okazaki; Hisasi Kawai; Takeshi Matsui, both of Toyohashi; Kyo Hattori, Susono; Kazuhiro Sakurai, Gotenba, all of Japan

[73] Assignees: Nippon Soken, Inc., Nishio; Toyota Jidosha Kogyo Kabushiki Kaisha, Toyota, both of Japan

[21] Appl. No.: 234,264

[22] Filed: Feb. 13, 1981

[30] Foreign Application Priority Data

Feb. 15, 1980 [JP] Japan ................................ 55-17976

[51] Int. Cl.³ .................... F16K 31/08; H02K 33/02
[52] U.S. Cl. ...................................... 251/65; 251/129; 335/229; 335/230; 137/625.47
[58] Field of Search ................. 251/134, 133, 129, 65; 335/229, 230; 137/625.47

[56] References Cited

U.S. PATENT DOCUMENTS

| | | | |
|---|---|---|---|
| 2,872,154 | 2/1959 | Jones | 251/133 |
| 3,054,426 | 9/1962 | Fritz et al. | 251/133 X |
| 3,177,385 | 4/1965 | Montagu | 335/229 X |
| 3,248,080 | 4/1966 | Plasko | 251/133 X |
| 3,304,524 | 2/1967 | Zoltan . | |
| 3,323,548 | 6/1967 | Ludwig | 251/133 X |
| 3,434,082 | 3/1969 | Montagu | 335/229 |
| 3,593,238 | 7/1971 | Mori | 335/229 |
| 3,794,868 | 2/1974 | Haigh | 335/230 X |
| 4,135,119 | 1/1979 | Brosens | 335/230 X |
| 4,282,502 | 8/1981 | Nicholson . | |

*Primary Examiner*—Arnold Rosenthal
*Attorney, Agent, or Firm*—Cushman, Darby & Cushman

[57] ABSTRACT

A proportional solenoid comprises a rotary magnet for causing a rotational displacement within an angle of 180 degrees in proportion to a current supplied to a coil, a torsion bar for damping the rotation of the rotary magnet and a rotary valve driven by the rotation of the rotary magnet.

6 Claims, 10 Drawing Figures

PROPORTIONAL SOLENOID

BACKGROUND OF THE INVENTION

The present invention relates to a proportional or linear solenoid in which a rotation angle of a rotary shaft is determined by a balance of the rotating force of a rotary magnet and the resorting force of a torsion bar.

A prior art proportional solenoid used in various devices comprises, as shown in FIG. 1, a cylindrical case 100 in which a hollow cylindrical coil 101 is mounted and a core 102 is mounted at the center of the coil 101. A plunger 103 is mounted with a constant air gap 104 to the core 102 to form a moving element. Numeral 105 denotes an oil impregnated plastic member located at the center of the core 102 to support the plunger 103. The proportional solenoid has an air passage 106 and is used to control an air flow rate.

In the device of the structure described above, the plunger 103 has a stroke of only approximately 5 mm. When it is to be used in an exhaust gas control apparatus for an automobile, a flow rate control from 0 to 600 l/min. is necessary. Accordingly, the air passage 106 must have a diameter of 14 mm or larger. This results in the increase in an overall apparatus. Furthermore, since the air gap 104 is opened and closed by the linear motion of the plunger 103, it is easily subject to vibration.

SUMMARY OF THE INVENTION

It is an object of the present invention to provide a proportional (linear) solenoid which resolves the difficulties described above and in which the moving element is a rotary shaft which moves rotationarily rather than axially and a rotary magnet is rotated within an angle of 180 degrees by a magnetic field of a stationary coil and a rotation angle of the rotary shaft is established by balancing a rotating force of the rotary magnet with a restoring force of a torsion bar so that the rotary shaft is rotated to a rotation angle which is in proportion to a current magnitude with a small and simple structure.

It is another object of the present invention to provide a proportional solenoid having flow rate control valve moved with the rotary shaft such that an aperture is set in accordance with the rotation angle of the rotary shaft so that a large capacity of flow rate is controlled with a small and simple structure and the solenoid is hardly subject to the influence of a pressure difference between input and output ports.

BRIEF DESCRIPTION OF THE DRAWINGS

FIG. 2b shows a sectional view taken along a line IIb—IIb in FIG. 2a.

FIG. 2c shows magnetization of a rotary magnet of the proportional solenoid shown in FIG. 2a.

FIG. 2d shows a bottom view of the proportional solenoid shown in FIG. 2a.

FIG. 3 shows a schematic view of a drive element of the proportional solenoid shown in FIG. 2a.

DETAILED DESCRIPTION OF THE PREFERRED EMBODIMENTS

A preferred embodiment of the present invention is now explained with reference to the drawings.

Figure 1:
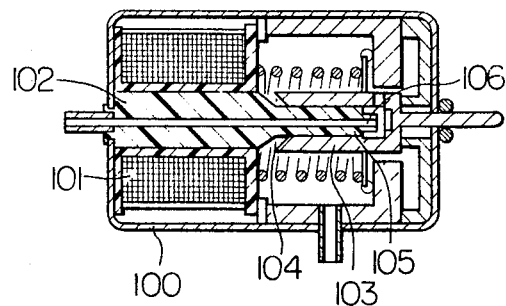
FIG. 1 shows a structure, in sectional view, of a prior art proportional solenoid.
Figure 2A:
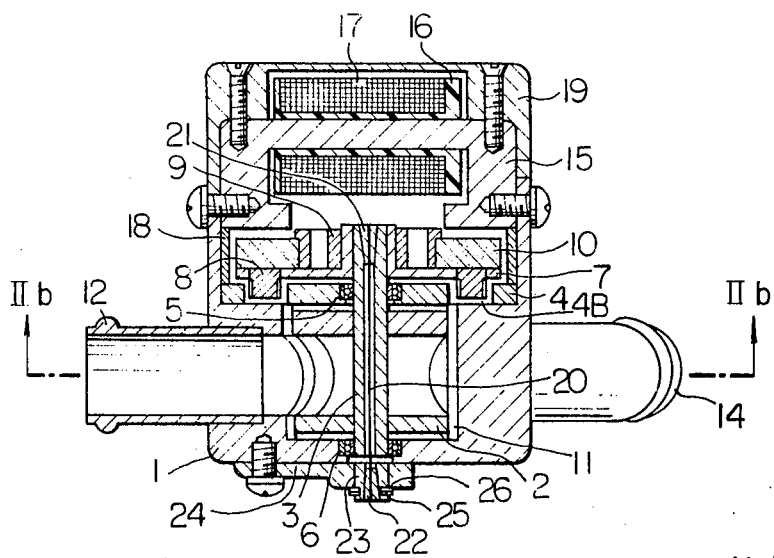
FIG. 2a shows a structure, in longitudinal sectional view, of one embodiment of a proportional solenoid in accordance with the present invention.
Figure 2C:
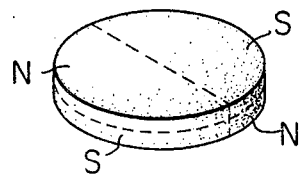
Figure 2B:
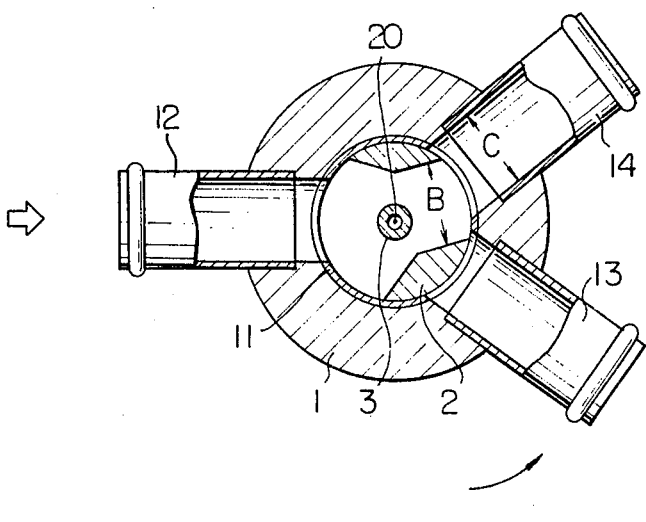
Figure 2D:
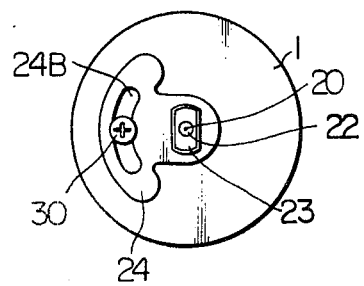

FIG. 2 shows a proportional solenoid having a cross valve for controlling an air flow rate, in which FIG. 2a shows a longitudinal sectional view, FIG. 2b shows a sectional view taken along a line IIb—IIb in FIG. 2a and FIG. 2c shows magnetization of a rotary magnet shown in FIG. 2a. Referring to FIGS. 2a and 2b, numeral 1 denotes a valve housing made of aluminum, and numeral 2 denotes a valve rotor made of stainless steel, both forming a main part of a flow rate control valve. Numeral 3 denotes a rotary shaft made of stainless steel and numeral 4 denotes a plate made of aluminum having two arcuate slots 4B. Numerals 5 and 6 denote bearings. Numeral 7 denotes a stopper plate and numeral 8 denotes a stopper both being made of magnetic material. The slots 4B allow the stopper 8 to move within a predetermined angle. When the stopper 8 reaches an end of the slot 4B, further movement of the stopper 8 is suppressed. The stopper 8 is welded to the stopper plate 7 at several points after the former has been press-inserted into the latter. A rubber member is affixed to the stopper 8 by heating. Numeral 9 denotes a magnet holder made of aluminum having a flange at one end thereof and having several bores (two bores are shown in FIG. 2a). Numeral 10 denotes a rotary magnet which is magnetized thicknesswise as shown in FIG. 2C with the polarities being inverted at an angle of 180 degrees. The bearing 5 is pressed into the plate 4. After the bearing 5 and the plate 4 have been mounted on the rotary shaft 3, the valve rotor 2 is pressed to the rotary shaft 3. The stopper plate 7 is further pressed to the rotary shaft 3 and the rotary magnet 10 is integrally coupled to the rotary shaft 3 by a male screw formed in the stopper plate 7 and a female screw formed in the magnet holder 9. More particularly, an inner circumference of the magnet holder 9 and a center protrusion of the stopper plate 7 are threadedly coupled by inserting pins into the bores of the magnet holder 9 and imparting a torque to the magnet holder 9 to couple it with the stopper plate 7. After coupling, the pins are removed. Numeral 11 denotes a valve bush made of stainless steel. It is pressed into the valve housing 1. A clearance between the valve bush 11 and the valve rotor 2 is 0.02 mm. Numerals 12, 13 and 14 denotes pipes which are pressed into the valve housing 1 and having an inner diameter of 14 mm and an outer diameter of 16 mm. The input pipe 12 forms an input port while the output pipes 13 and 14 form output ports. Numeral 15 denotes a yoke core made of magnetic material and having two sector-shaped flanges. Numeral 16 denotes a coil bobbin made of bakelite on which a coil 17 is wound along the length of the coil bobbin 16. The yoke core 15, the coil bobbin 16 and the coil 17 form a stationary coil element. Numeral 18 denotes a spacer made of brass, by which the rotary magnet 10 and the yoke core 15 are held oppositely with a predetermined space therebetween. Numeral 19 denotes a cap made of non-magnetic material which is fixed to the yoke core 15 by two screws. The yoke core 15 is fixed to the valve housing 1 by two screws. Numeral 20 denotes a torsion bar which may be a stainless steel wire having a diameter of 0.6 mm. Numerals 21 and 22 denotes spring holders made of stainless steel each having a funnel-shaped external contour and an internal bore through which the torsion bar 20 extends and a slit. The rotary shaft 3 has a through-hole and at one end thereof it has a funnel-shaped bore having the same slope as that of the spring holder 21 for receiving the spring holder 21 therein. The torsion bar 20 is inserted into the bore of the spring holder 21, which is then pressed to fix the torsion bar 20 to the rotary shaft 3. Numeral 23 denotes a thrust holder made of stainless steel having a two-sided portion and thread on the surface area other than the two-sided area for threadedly engaging with a nut. It has an internal through-hole and at one end thereof it has a funnel-shaped bore having the same slope as that of the spring holder 21. The spring holder 22 is inserted into the funnel-shaped bore of the thrust holder 23, one end of the torsion bar 20 is inserted into the bore of the spring holder 22, and the spring holder 22 is pressed to fix the torsion bar 20 to the thrust holder 23. Numeral 24 denotes an adjuster having at one end thereof a hole of a width equal to the distance between the two sides of the thrust holder 23. The thrust holder 23 is inserted into the hole, and a circlip 25 and a shim 26 are inserted into a groove in the outer surface of the thrust holder 23 to present the thrust holder 23 to be removed upward of the adjuster 24. The outer end of the adjuster 24 has an arcuate slot 24B as shown in FIG. 2d and is fixed to the valve housing 1 by a screw 30. The thrust holder 23 is slightly movable circumferentially of the housing. Through this movement, the adjuster 24 is moved around the center axis and then it is fixed to bottom of the housing by a screw. In this manner, an initial position of the rotor can be set to any desired position.

The air passage of the valve rotor 2 is shown by a non-hatched area in FIG. 2b, in which an area B is a bore having a diameter of 14 mm. When electric power is not supplied, the area B is connected to the output port 13 and the output port 14 is fully closed and the restoring force of the torsion bar 20 is set to zero gram. The setting is done by moving the adjuster 24 circumferentially as described above.

Figure 3:
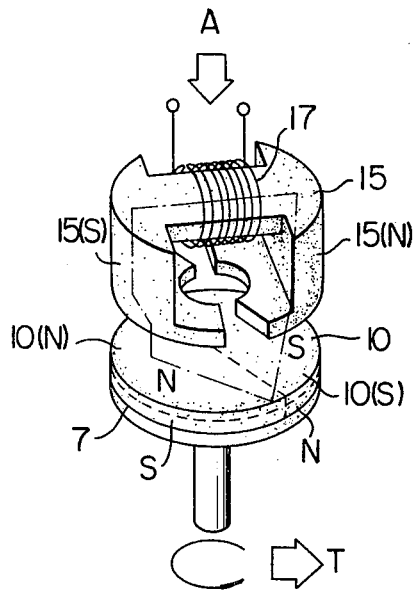

The operation of the construction described above is now explained. The stationary coil element and the rotary magnet 10 function as an axial air gap type two-pole motor. As shown by a dot-and-chain line in FIG. 3, a magnetic path emerges from an N-pole (15N) of the yoke core 15, passes through an S-pole (10S) of the opposing rotary magnet 10, an axially opposing N-pole thereof, the stopper plate 7, a circumferentially opposing S-pole, an axially opposing N-pole (10N) and reaches an S-pole (15S) of the opposing yoke core 15. When a current flows through the coil 17, the yoke coil 15 acts as an electromagnet having the N-pole and the S-pole as shown in FIG. 3. The N-pole of the yoke core 15 attracts the S-pole of the rotary magnet 10 and repels the N-poles. The S-pole of the yoke core 15 attracts the N-pole of the rotary magnet 10 and repels the S-pole. Consequently, the rotary magnet 10 tends to rotate in the direction shown by an arrow in FIG. 3. A torque T is proportional to a magnetic force of the yoke core 15, that is, a magitude A of the current flowing in the coil 17 because magnetic fluxes of the rotary magent are constant. On the other hand, as the torsion bar 20 rotates in the direction shown by the arrow in FIG. 3, the restoring force thereof increases. That is, a returning force opposite to the direction of the arrow is produced in proportion to the rotation angle so that the rotation angle which is proportional to the magnitude of the current flowing in the coil 17 results. In the present embodiment, a maximum rotation angle is approximately 72 degrees. On the other hand, since the valve rotor 2 is integrally coupled to the rotary magnet 10, it rotates with the rotary magnet 10. In FIG. 2b, as the current flowing in the coil 17 increases, the valve rotor 2 rotates in the direction of the arrow. An overlapped area of the open area B of the valve rotor 2 and the open area C of the output port 14 corresponds to a passage surface for the air to be controlled. Accordingly, the overlapped open area for the rotation angle is a function of the shape of the passage (throughhole) of the valve rotor 2 and the shape of the passage of the valve bush 11 at the output port 14 which faces the valve rotor 2. Thus, the amount Q of air flowing from the input port 12 to the output port 14 versus the magnitude A of the current flowing in the coil 12 may have any desired characteristic.

Figure 4:
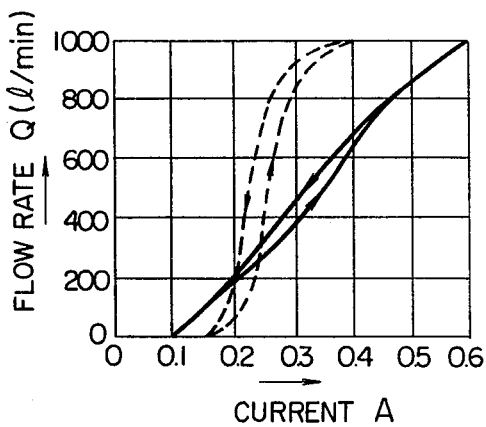
FIG. 4 shows a characteristic chart used to explain the operation of the present invention.

FIG. 4 shows a characteristic of the flow rate Q versus the current A in the coil 17 in the present embodiment. A pressure difference between the input port 12 and the output port 14 is 200 mm Hg. A solid line shows the characteristic of the proportional solenoid in accordance with the present invention and broken line shows the characteristic of that in accordance with prior art. As seen from the characteristic curves, the proportional solenoid of the present invention has much better linearity than that of the prior art.

Figure 5:
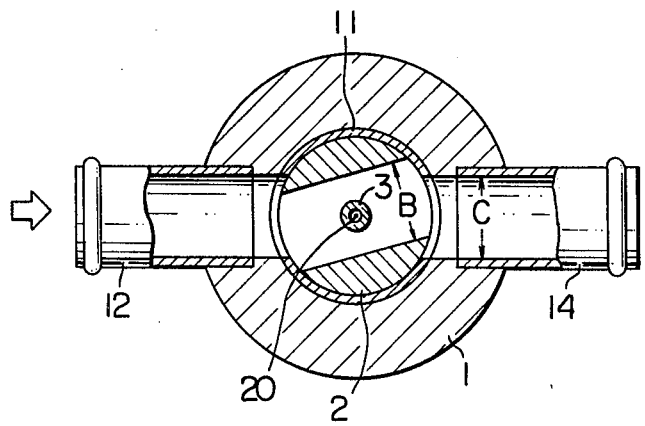
FIG. 5 shows a sectional view of another embodiment of the present invention.

FIG. 5 shows a sectional view (taken at the same position as that in the previous embodiment) of another embodiment of the present invention, in which the valve housing 1 and the valve rotor 2 are of two-way valve structure and the other components are same as the corresponding ones in the previous embodiment. The air entering from the input port 12 passes through the through-hole of the valve rotor 2 and flows out of the output port 14. The flow rate is determined by the rotation angle of the valve rotor 2, that is, the magnitude of the current flowing in the coil 17.

In the embodiment described above, the torsion bar 20 is used as a spring to impede the rotational force of the rotary magnet 10 and the torsion bar 20 is housed in the rotary shaft 3 so that a volume occupied by the spring is reduced to substantially zero. Furthermore, since the torsion bar 20 does not contact other ports except at the fixing point, no friction occurs.

Figure 6A:
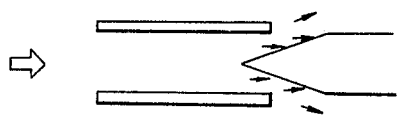
FIGS. 6a and 6b illustrate principles of the proportional solenoids in accordance with the prior art and the present invention, respectively.
Figure 6B:
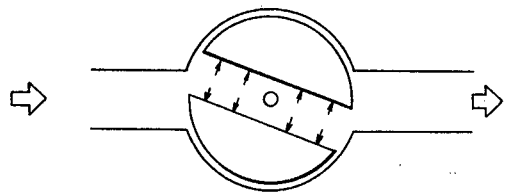

FIG. 6 illustrates principles of the prior art proportional solenoid and the present proportional solenoid. In the plunger type proportional solenoid shown in FIG. 6a, if there is a pressure difference between the input port and the output port, the plunger exclusively receives a force as shown by arrows so that a flow rate characteristic changes depending on the pressure difference. In the rotary proportional solenoid shown in FIG. 6b, the forces are applied uniformly as shown by arrows so that the characteristic is not influenced by the pressure difference.

As described hereinabove, in accordance with the present invention, the rotary magnet is rotated by the magnetic field of the stationary coil element within the angle of the 180 degrees and the rotating force of the rotary magnet and the restoring force of the torsion bar are balanced to establish the rotation angle of the rotary shaft. Accordingly, the rotary shaft can be rotated by the rotation angle which is proportional to the magnitude of the current flowing in the stationary coil element, with the compact and simple structure.

Furthermore, in accordance with the present invention, the flow rate control valve which moves with the rotary shaft and having the aperture thereof set in accordance with the rotation angle of the rotary shaft is provided. Accordingly, the solenoid is highly resistive to vibration and hardly subject to the influence by the pressure difference between the input port and the output port of the flow rate control valve and can control a large capacity of flow rate with the compact and simple structure.

What is claimed is:

1. A proportional solenoid valve apparatus comprising, a housing having an inlet and an outlet, a rotary hollow shaft rotatably held by said housing, a rotary valve disposed in said housing and fixed to said rotary hollow shaft, a stationary coil element for generating a magnetic field in response to a current supplied thereto, a rotary magnet fixed to one end of said rotary hollow shaft and being responsive to said magnetic field for creating a rotating force in proportion to the strength of said magnetic field within a rotation angle of 180 degrees, and spring means made of a torsion bar for controlling the rotation of said rotary magnetic by a restoring force, said torsion bar extending through said rotary hollow shaft and one end of said torsion bar being fixed to said one end of said torsion bar being fixed to said one end of said rotary hollow shaft and the other end of said torsion bar being fixedly secured to said housing, a rotation angle of said rotary hollow shaft being established by the balance of the rotating force of said rotary magnet and the restoring force of said spring means.

2. A proportional solenoid valve apparatus according to claim 1, wherein said rotary valve is one of a two-way valve and a cross valve.

3. A proportional solenoid valve apparatus according to claim 1, wherein said stationary coil element includes a U-shaped core and a coil wound on said core and said rotary magnetic comprises a disc-shaped magnet having two magnetized areas of opposite polarities opposing to legs of said U-shaped core.

4. A proportional solenoid valve apparatus according to claim 1, 2 or 3 further comprising means fixed to said torsion bar externally of said housing for adjusting an initial position of said magnet by said torsion bar.

5. A proportional solenoid valve apparatus according to claim 1, 2 or 3 further comprising stopper means for controlling the rotational displacement of said magnet within an angle of 180 degrees.

6. A proportional solenoid valve apparatus according to claim 3, wherein said U-shaped core has legs each having a sector-shaped flange at an end thereof.

* * * * *